(12) United States Patent
Xin et al.

(10) Patent No.: US 8,755,605 B2
(45) Date of Patent: Jun. 17, 2014

(54) SYSTEM AND METHOD FOR COMPACT DESCRIPTOR FOR VISUAL SEARCH

(75) Inventors: Xin Xin, Chicago, IL (US); Zhu Li, Palatine, IL (US); Aggelos K. Katsaggelos, Chicago, IL (US)

(73) Assignee: Futurewei Technologies, Inc., Plano, TX (US)

( * ) Notice: Subject to any disclaimer, the term of this patent is extended or adjusted under 35 U.S.C. 154(b) by 189 days.

(21) Appl. No.: 13/340,327

(22) Filed: Dec. 29, 2011

(65) Prior Publication Data
US 2013/0016908 A1 Jan. 17, 2013

Related U.S. Application Data

(60) Provisional application No. 61/506,615, filed on Jul. 11, 2011.

(51) Int. Cl.
*G06K 9/46* (2006.01)
*G06K 7/14* (2006.01)

(52) U.S. Cl.
CPC .................................. *G06K 7/1447* (2013.01)
USPC ....................................................... 382/191

(58) Field of Classification Search
CPC .......... H04N 1/32144; H04N 1/32149; H04N 1/32187; H04N 1/32203; H04N 1/32208; H04N 1/32245; H04N 1/32251; H04N 1/32288; H04N 1/3232; H04N 1/32352; H04N 5/913; H04N 19/00557; H04N 21/23892; H04N 21/8358; H04N 2201/3233; H04N 2201/327; H04N 2201/3205; H04N 2201/3207; H04N 2201/3225; H04N 2201/3226; H04N 2201/323; H04N 2201/3235; H04N 2201/3274; H04N 2005/91321; H04N 2005/91335; G06T 1/005; G06T 1/0028; G06T 1/0064; G06T 1/0071; G06T 2201/0051; G06T 2201/0052; G06T 2201/0061; G06T 2201/0064; G06T 2201/0065; G11B 20/0086; G11B 20/0094; G11B 20/00115; G11B 20/00166; G11B 20/00181; G11B 20/0021; G11B 20/00231; G11B 20/0071; G11B 20/00884; G06F 17/30876; G06K 7/1447; G06K 19/06037; G06K 2017/0064; G06K 2019/06253; G07D 7/002; G07D 7/004; G07D 7/20; G07D 7/2008; G07D 7/2033; G07F 7/08; G07F 7/086; G07F 7/1008; G07F 7/1016; G07F 7/12
USPC .................. 382/100; 380/240, 243, 247, 255; 358/3.28; 705/50, 57–59; 707/712; 713/176, 179; 715/202, 240–243
See application file for complete search history.

(56) References Cited

U.S. PATENT DOCUMENTS 5,721,788 A * 2/1998 Powell et al. ................. 382/100
6,614,914 B1 * 9/2003 Rhoads et al. ................ 382/100
(Continued)

FOREIGN PATENT DOCUMENTS

| CN | 101211355 A | 7/2008 |
|---|---|---|
| CN | 101980250 A | 2/2011 |

OTHER PUBLICATIONS

Bay, H., et al., "Speeded-Up Robust Features (SURF)," Sep. 10, 2008, pp. 1-14.
(Continued)

*Primary Examiner* — Jose Couso
(74) *Attorney, Agent, or Firm* — Slater & Matsil, L.L.P.

(57) ABSTRACT

A method and an apparatus for processing an image generates, using a linear embedding operator, a second set of feature points from a first set of feature points of the image, so that a pair-wise nearest neighbor (NN) topological relationship among the first set of feature points is preserved in the second set of feature points. The linear embedding operator is determined by an affinity model comprising a first affinity parameter, a second affinity parameter, and an affinity matrix, wherein a sparsity of the affinity matrix is controlled by the first affinity parameter and the second affinity parameter.

20 Claims, 4 Drawing Sheets

(56) References Cited

U.S. PATENT DOCUMENTS

| | | | | |
|---|---|---|---|---|
| 6,879,701 B1* | 4/2005 | Rhoads | | 382/100 |
| 7,054,465 B2* | 5/2006 | Rhoads | | 382/100 |
| 7,308,110 B2* | 12/2007 | Rhoads | | 382/100 |

OTHER PUBLICATIONS

He, X. et al., "Face Recognition Using Laplacianfaces," IEEE Transactions on Pattern Analysis and Machine Intelligence, vol. 27, No. 3, Mar. 2005, pp. 1-13.

Lowe, D.G. "Object Recognition from Local Scale-Invariant Features," Proceeding of the International Conference on Computer Vision, Sep. 1999, pp. 1-8.

"Call for Proposals for Compact Descriptors for Visual Search," International Oganisation for Standardisation, ISO/IEC JTC1/SC29/WG11, Coding of Moving Pictures and Audio, Jul. 2011, 5 pages.

"Written Opinion of the International Searching Authority," International Application No. PCT/CN2012/070006, Applicant: Huawei Technologies Co., Ltd., et al., mailing date: Apr. 19, 2012, 6 pages.

* cited by examiner

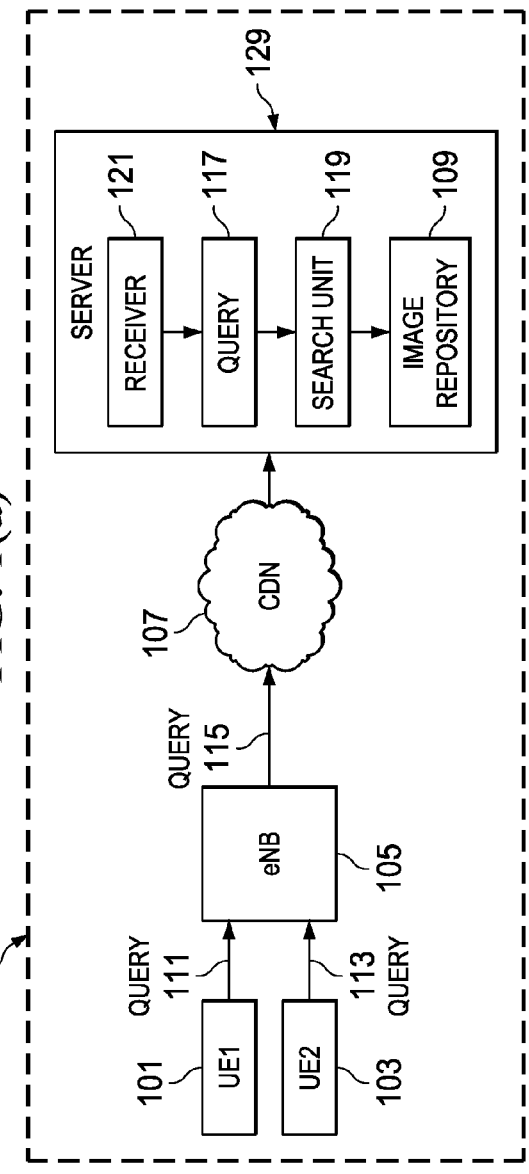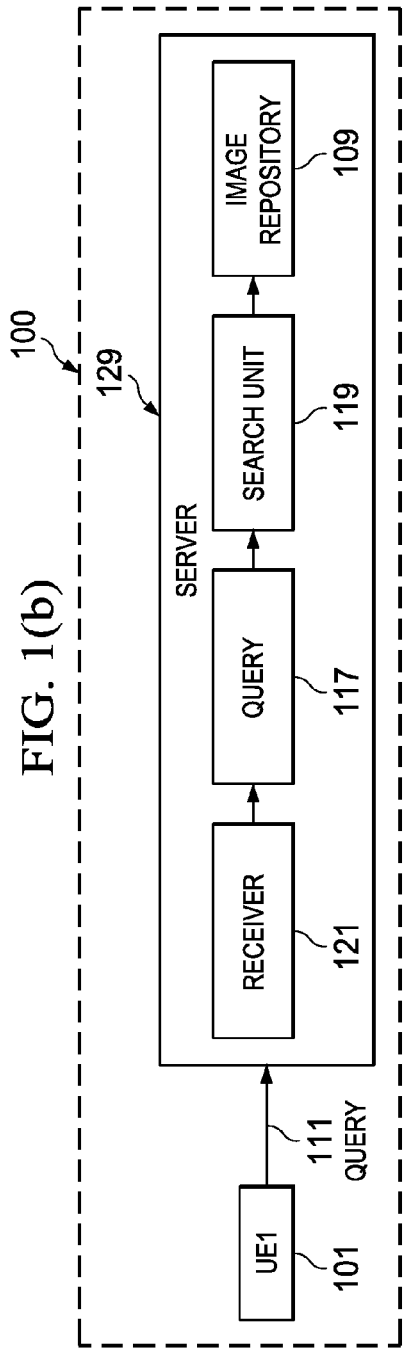

SYSTEM AND METHOD FOR COMPACT DESCRIPTOR FOR VISUAL SEARCH

This application claims the benefit of U.S. Provisional Application No. 61/506,615, filed on Jul. 11, 2011, entitled "System and Method for Laplacian SURF as Compact Descriptor for Visual Search," which application is hereby incorporated herein by reference in its entirety.

TECHNICAL FIELD

The present invention relates to image processing methods and systems, and in particular embodiments, to systems and methods for compact representation of visual descriptors of images with applications in visual search.

BACKGROUND

Modern-era mobile phones, handsets, tablets, mobile terminals, mobile devices, or user equipments have evolved into powerful image- and video-processing devices, equipped with high-resolution cameras, color displays, and hardware-accelerated graphics. With the explosive growth of mobile devices, like android, iPhone, mobile based multimedia visual services are enjoying intense innovation and development. Application scenarios of mobile visual search services can be location based services, logo search, and so on, where one image or multimedia sent from a mobile device is matched to another one stored in a database or an image repository. First deployments of mobile visual-search systems include Google Goggles, Nokia Point and Find, Kooaba, and Snaptell.

The image queries sent by mobile devices through a wireless network are usually computationally expensive, requiring prohibitively high communication cost, and cannot support real time operations. In popular applications where a mobile device captures a picture of certain objects and sends it as a query over a wireless network to search a large repository, reducing the bit rate while preserving the matching accuracy is a main concern and a main focus of the standardization effort under MPEG.

Visual descriptors or image descriptors are descriptions of the visual feature points of the contents in images and videos that produce such descriptions. They describe elementary characteristics such as the shape, the color, the texture, or the motion, among others, and they allow quicker and more efficient searches of the audio-visual content. The standardization organization that deals with audio-visual descriptors is the Motion Picture Expert Group-7 (MPEG-7).

However, for mobile devices, visual descriptors are usually still very heavy as they comprise of hundreds of scale and rotation invariant feature points, as well as their locations. Sometimes these scale invariant feature points may be larger than the image itself. An example feature point of scale-invariant feature transform (SIFT) comprises of 128 dimension with 2048 bits. Another example feature point of speeded up robust features (SURF) comprises of 64 dimension with 1024 bits.

Hence the need exists to find a model that reduces the size of representation of the feature points of an image, while preserving the matching performance for the queries comprising of the reduced feature point representations.

SUMMARY

With explosive growth of visual content repository in the Internet, a visual descriptor scheme that can support query-by-capture over the wireless link becomes attractive in a number of applications. In this disclosure, compression schemes based on graph spectral embedding model for reducing high dimensional feature points of visual descriptors of an image to lower dimension representations are presented. The compression schemes achieve good scalability in query accuracy and bit rate required for transmitting the feature points of the visual descriptors over a network.

In accordance with an example embodiment, a method for processing an image is provided. The method generates, using a linear embedding operator which may be a matrix, a second set of feature points from a first set of feature points of the image, so that a pair-wise nearest neighbor (NN) topological relationship among the first set of feature points is preserved in the second set of feature points, wherein a feature point is a point represented by a group of numbers.

In accordance with an example embodiment, an apparatus for processing an image is provided. The apparatus may be located in a user equipment or in a base station. The apparatus may comprise a receiver configured to receive a first set of feature points of the image, a linear embedding unit configured to generate, using a linear embedding operator which may be a matrix, a second set of feature points from the first set of feature points, wherein a pair-wise nearest neighbor (NN) topological relationship among the first set of feature points is preserved in the second set of feature points.

In accordance with an example embodiment, an apparatus for processing an image is provided. The apparatus may comprise an image repository wherein an image in the image repository is represented by a set of feature points, a receiver configured to receive a set of compressed feature points of a first image, and a searching unit configured to match the feature points of images stored in the repository to the set of received compressed feature points of the first image; wherein the compressed feature points are generated by a linear embedding operator determined by an affinity model comprising a first affinity parameter, a second affinity parameter, and an affinity matrix, wherein a sparsity of the affinity matrix is controlled by the first affinity parameter and the second affinity parameter.

BRIEF DESCRIPTION OF THE DRAWINGS

For a more complete understanding of the present invention, and the advantages thereof, reference is now made to the following descriptions taken in conjunction with the accompanying drawing, in which:

FIGS. 1(a) and 1(b) illustrate an example of a content distribution network and a visual search system with mobile terminals;

DETAILED DESCRIPTION OF ILLUSTRATIVE EMBODIMENTS

Figure 2A:
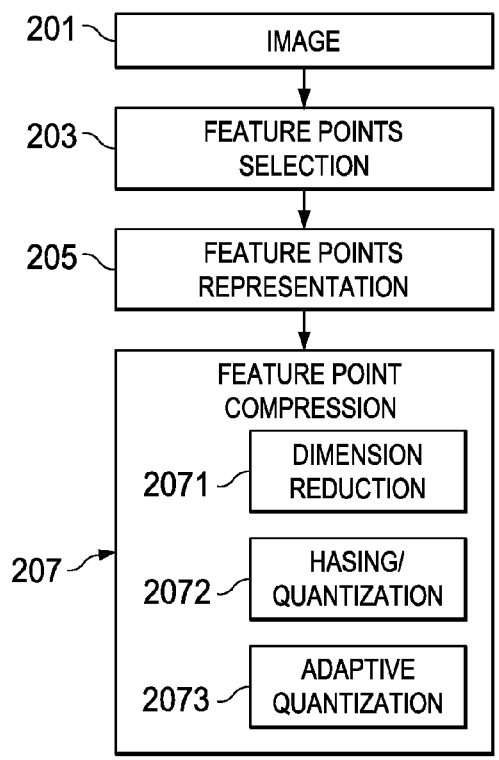
FIGS. 2(a) and 2(b) illustrate a sequence of operations performed on an image to represent an image by a set of compressed feature points.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As will be more fully explained below, a compression system which is also called a linear embedding system of feature points will be disclosed. The system reduces the number of bits needed to represent feature points of an image, while maintaining a pair-wise nearest neighbor (NN) topological relationship among the feature points, wherein the feature points are representations of images.

FIG. 1(a) illustrates an example embodiment of visual search system 100 where a mobile device or a user equipment (UE) UE1 101 or UE2 103 sending multimedia queries 111 or 113 through a base station 105 and a content distribution network (CDN) 107. The terms mobile phones, handsets, tablets, mobile terminals, mobile devices, or user equipments are used in an interchangeable way. The queries 111, 113 are received by a receiver 121 within the server 129 as the query 117, which is used by a search unit 119 to search in an image repository 109. The UE1 101, UE2 103, or the base station eNB 105 may be collectively referred to as clients and the server 129 comprising the receiver 121, the search unit 119, and the image repository 109 may be collectively referred to as a server 129.

The visual search system 100 may be location based services, logo search, and so on. The UEs 101 and 103 may be connected to base stations eNB 105 through wireless communication channels. The UEs 101 and 103 may be a mobile phone, a user terminal, mobile station, iPHONE, or any other similar devices. There may be a different number of UEs connected to the base station eNB 105. A UE 101 or 103 may send a plurality of queries 111, 113 to the base station 105.

The UEs 101, 103, the base station 105, and the CDN 107 may be part of a Long Term Evolution (LTE) wireless system, a Long Term Evolution Advanced (LTE-A) system, an IEEE 802.16m system, or any other kind of wireless system. The visual search system 100 illustrated in FIG. 1(a) may be implemented in other ways, and represented in an abstract level illustrated in FIG. 1(b), where a UE1 101 is connected to an image repository 109, and UE1 101 sends a query 111 received by a receiver 121 within the server as a query 117, which is used to search the image repository 109.

The query 111 or 113 are sent from the UEs 101 or 103 to a base station 105. In some embodiments, the base station 105 may directly transfer the query 111 or 113 to the server 129 as the query 117 received by the server 129. The base station 105 may perform certain operations on the query 111 or 113 to generate a different query 115 and send the query 115 through the CDN 107 and received by the server 129 as 117 received query.

If the query 111 sent from the UE 101 and the received query 117 are an image, the image query may be used to search and match to images stored in the database or image repository 109. Typically, this is accomplished using special index structures, allowing fast access to lists of images. The image based queries 111 or 117 are usually computationally expensive, requiring additional prohibitive communication cost, and cannot support real time operation required by CDN applications.

The query 111 or the query 117 may be visual descriptors. Visual descriptors or image descriptors are descriptions of the visual features of the contents in images and videos that produce such descriptions. They describe elementary characteristics such as the shape, the color, the texture, or the motion, among others, and they allow the quick and efficient searches of the audio-visual content. Visual descriptors may be divided in two main groups. General information descriptors contain low level descriptors which give a description about shape, color, regions, texture, or the motion. Specific domain information descriptors give information about objects and events in the scene. A concrete example would be face recognition. Other high discriminating descriptors include speeded up robust features (SURF) and scale-invariant feature transform (SIFT), which are robust image detectors and descriptors. In visual search applications, the matching ability of the descriptors of the query image to the descriptors of the database image is critical to a successful matching.

Visual descriptors may represent visual objects and points of interest as a set of feature points, which may be scale and rotation invariant, or any other properties. In an embodiment, when visual descriptors are used to match images, the received query 117 may be a set of feature points extracted from an image. A collection of these feature points and their topological information gives a unique representation of certain objects invariant to scale, rotation, and some degree of view angle changes. Matching two images is equal to matching two sets of feature points in the images and the number of matched features is used as indicator for match.

According to an embodiment, a feature point $F_j$ is a point in $R^{n_j}$, where $n_j$ is the dimension of the feature point $F_j$, and a feature dimension $i \in R^{n_j}$ for the feature point $F_j$ has a $p_i$ bit precision represented by $p_i$ bits. This may be called the resolution of the feature point at the dimension i. For a set of feature points, the feature point in the set may have the same dimension or different dimensions.

FIG. 2(a) illustrates an operation flow which may be used when using feature points of visual descriptors to perform visual search according to an embodiment. The operations illustrated in FIG. 2(a) may be performed by a mobile terminal, or by the combination of a mobile terminal and a base station, or any other components in a network.

As an example embodiment, an image is provided at step 201. At step 203, the feature points may be selected using repeatable feature extractors performed by a mobile terminal or a base station. When a set of a collection of scale and rotation invariant feature points such as SURF and SIFT feature points are used as visual descriptors, those feature points are found in a visual object by edge detection across multiple scales. In an embodiment, only those points with strong edge info consistent across scale are selected to be feature points. Rotation invariance is achieved by descriptor that describes the edge orientations. A feature point set may comprise of hundreds of scale and rotation invariant feature points, as well as their locations in the original image. Other visual descriptor feature points may be extracted as well instead of SURF or SIFT. The use of SURF and SIFT are for illustration purposes only and are not limiting.

In an embodiment, for example, at step 205, feature points are represented. Various feature points such as SURF or SIFT feature points are represented in different ways. For example, each feature point of SURF is 128 dimensions with 2048 bits. A feature point of SIFT, on the other hand, has 64 dimension with 1024 bits. The high dimensionality of feature points makes a large scale visual object and point of interest repository search ineffective, as typical indexing schemes fails with high dimension.

Therefore a compression of the feature points may be needed to reduce the bit rate. As a example embodiment, at step 207, feature points compression operation is performed, for example, the feature points compression operation may be performed on any feature points, or some of the features points that reduces the size of representation, while preserving the matching performance. The compression operation may be called a linear embedding as well. According to an embodiment, the compression operation may be performed by a feature point compression unit. The feature point compression unit may be located on the terminal, or on the base station. The compressed feature points are transmitted to the server end which will process the search and return the result back to the mobile terminal.

There may be different approaches to reduce the size of the feature points in step 207, such as dimension reduction performed by a unit 2071 or a hashing/quantization performed by a unit 2072, or an adaptive quantization performed by a unit 2073. In another embodiment, these different methods may be combined to perform on the same set of feature points to achieve further reductions.

Dimension Reduction Methods use dimension reduction approaches to reduce feature point dimensions while preserving certain information. For example, hashing methods try to use an index for each feature point. With certain conditions, input feature points are mapped into a certain bucket with less resolutions. All points in the bucket are viewed as the match. Locality sensitive hashing, spectral hashing and vector quantization fall into this category. These methods enjoy the benefit of fast matching because of hashing, but lack accuracy because the point in the same bucket may not be a real match for the input feature points. Adaptive quantization further maps each feature point to different resolutions. For example, a feature point has a first precision for a first dimension and a second precision for a second dimension. The adaptive quantization may be done based on certain criteria such as the variance for the feature points. In some embodiments, a feature point has a first precision for a first dimension and a second precision for a second dimension, wherein the first precision for the first dimension with a higher variance for the feature point is more than the second precision for the second dimension with a lower variance for the feature point.

Figure 2B:
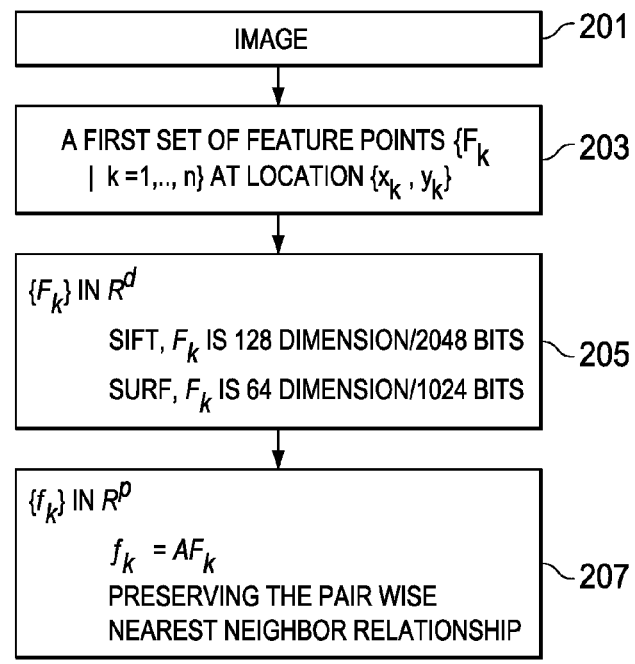

FIG. 2(b) illustrates a more detailed operation flow for compressed feature points. An image is provided at step 201. At step 203, a set of feature points, for example, $\{F_k | k=1, \ldots, n\}$, is extracted from the image, where each feature point $F_k$ is located in image position $\{x_k, y_k\}$ according to an embodiment. The set may consist of hundreds (e.g, 242) of feature points. At step 205, a feature point is represented as a point of d-dimensional space $R^d$. For example, d=128 for a SIFT feature point, d=64 for a SURF feature point. In step 207, a linear embedding matrix A is used to map or project the set of feature points $\{F_k\}$ to a smaller space of $\{f_k\}$ in $R^p$, with p is smaller than d, while still preserving the pair wise nearest neighbor $f_k=AF_k$ relationship with minimum loss of matching accuracy. Since a linear embedding matrix is used to perform the compression of feature points, the compression scheme may be referred as a linear embedding as well.

According to an embodiment, there may be many choices of the linear embedding matrix A. A more compact feature point representation may be constructed by preserving feature space geometric locality, in particular preserving the nearest neighbor (NN) topological relationship among the feature points. Preserving the nearest neighbor (NN) topological relationship is more crucial for visual search applications. In some embodiments, the resulting compact feature points can achieve high matching accuracy with 8 dimensions and 6 bits per dimension, a total of 48 bits per feature point.

Figure 3:
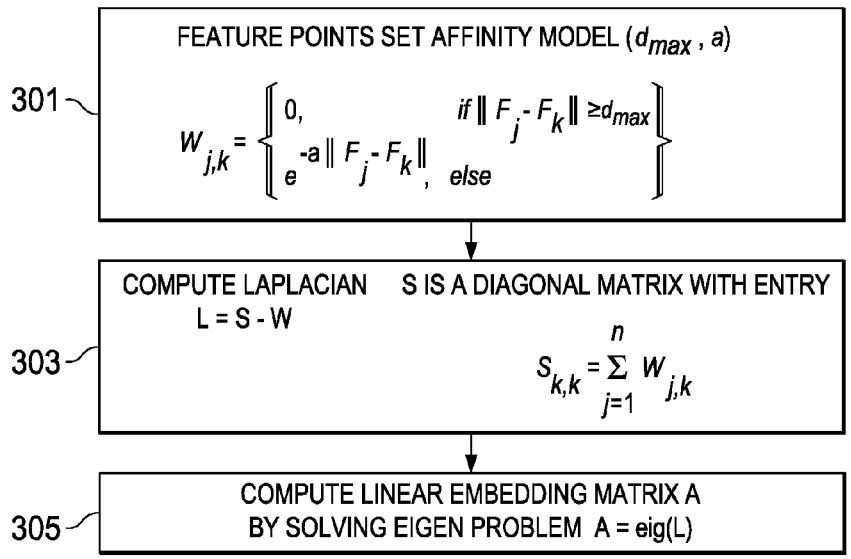
FIG. 3 illustrates a process for finding an embedding matrix for the feature points compression.

FIG. 3 illustrates one embodiment of how to find the linear embedding matrix A. The linear embedding matrix A is determined by an affinity model comprising a first affinity parameter $d_{max}$, a second affinity parameter a, and an affinity matrix $W=(w_{j,k})$ of size n*n, wherein a sparsity of the affinity matrix $W=(w_{j,k})$ is controlled by the first affinity parameter and the second affinity parameter, and n is a number of feature points. The affinity matrix $W=(w_{j,k})$ reflects the pair-wise feature points affinity to be preserved. The linear embedded matrix A is a solution to an objective equation $$A^* = \arg\min_A \sum_{j,k} w_{j,k} \|AF_j - AF_k\|,$$

where $W=(w_{j,k})$ of size n*n is the affinity matrix, $F_j$ and $F_k$ are feature points to be compressed.

Illustrated in FIG. 3, a feature point affinity model ($d_{max}$, a), and the affinity matrix $W=(w_{j,k})$ is determined at step 301. For a feature points set affinity parameters ($d_{max}$, a), the affinity matrix $W=(w_{j,k})$ is determined as $$w_{j,k} = \begin{cases} 0, & \text{if } \|F_j - F_k\| \geq d_{max} \\ e^{-a\|F_j - F_k\|}, & \text{else} \end{cases}.$$

Then in step 303, the Laplacian matrix L of the affinity matrix $W=(w_{j,k})$ is computed, wherein the matrix L=S−W, where S is a diagonal matrix with entry $$s_{k,k} = \sum_{j=1}^{n} w_{j,k},$$

and n is the number of feature points. In step 305, the linear embedding matrix A is computed by A=eigenvalue(L).

Figure 4:
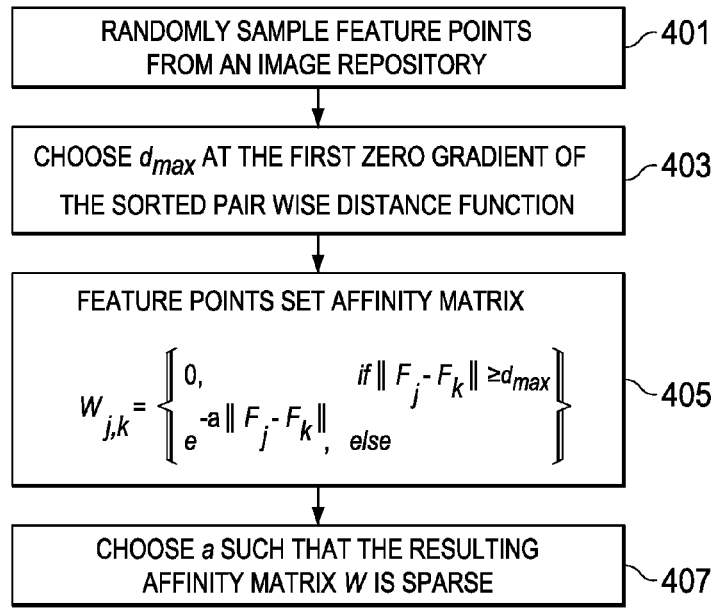
FIG. 4 illustrates a process for finding the affinity matrix and affinity model for the feature points compression.

FIG. 4 illustrates an embodiment method to construct the affinity model, which is used to determine the linear embedding matrix A. The first affinity parameter $d_{max}$, called the kernel parameter, is determined at step 403 as the first zero gradient of sorted pair-wise distance function for a sample feature point repository comprising a plurality of feature points, sampled at step 401. The second affinity parameter a, called the cutoff threshold, is chosen at step 407 so that the affinity matrix $W=(w_{j,k})$ shown in step 405 is sparse. As a increases, more of the neighborhood information is preserved. As a decreases, some desired information may be lost. So a provides tradeoff of precision and preserving needed information. Experiments, such as randomly sample 10,000 features, are conducted to find out best threshold.

In some embodiment, the second affinity parameter a value is obtained with equation $e^{-a*d_{max}^2}=0.25$. The resulting compression model A gives good retrieval performance for both SIFT and SURF.

Feature point compression can combine different methods. In some embodiment, after the dimension reduction by the linear embedding matrix illustrated above, adaptive quantization method shown in FIG. 2 as unit 2073 may be further combined with the compression performed as illustrated in FIG. 3, that the unit 2073 in FIG. 2 further maps each feature point to different resolutions. Most straightforward way for quantization is to assign equal number of bits on each dimension. This is suboptimal, because data at different dimensions have different variances. Uniform allocation of bits may cause some of the quantization bins to be very crowded while other bins are very sparse, which is supposed to be bad intuitively. An adaptive quantization scheme chooses quantization rate for each dimension depending on the variance of the dimension. For example, a feature point has a first precision for a first dimension and a second precision for a second dimension. In some embodiments, a feature point has a first precision for a first dimension and a second precision for a second dimension, wherein the first precision for the first dimension with a higher variance for the feature point is more than the second precision for the second dimension with a lower variance for the feature point.

Figure 5:
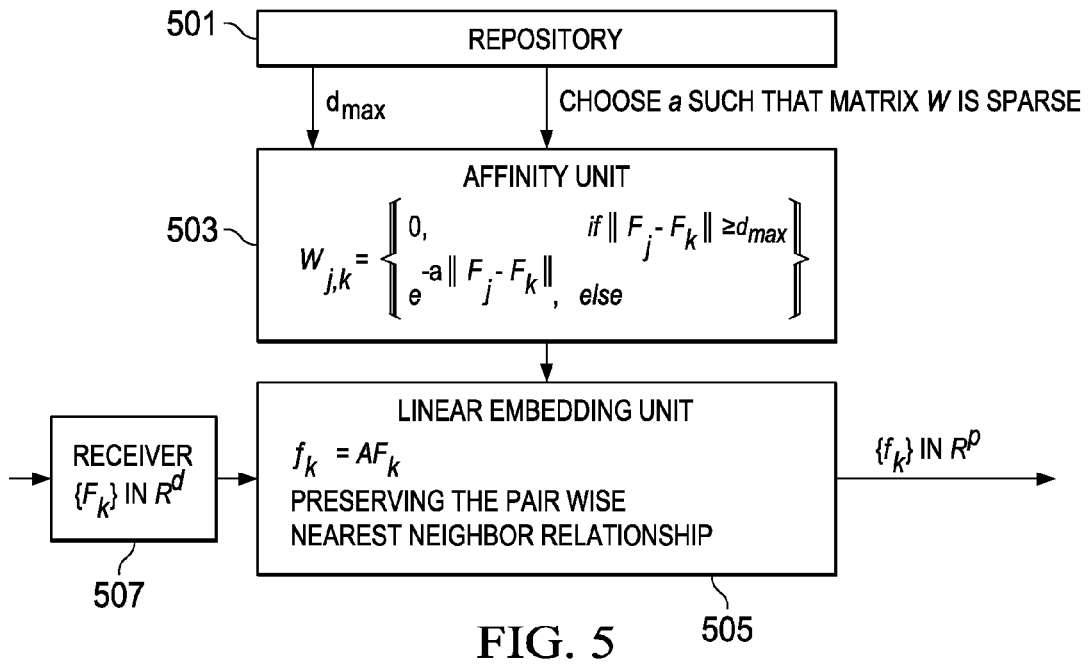
FIG. 5 illustrates an apparatus for feature points compression.

An example embodiment of apparatus for processing an image is illustrated in FIG. 5. The apparatus comprises a receiver 507 configured to receive a first set of feature points of the image, and a linear embedding unit 505. The linear embedding unit 505 is configured to generate, using a linear embedding matrix A, a second set of feature points from the first set of feature points, wherein a pair-wise nearest neighbor (NN) topological relationship among the first set of feature points is preserved in the second set of feature points. A feature point $F_j$ is a point in $R^{n_j}$, and a feature dimension $i \in R^{n_j}$ for the feature point $F_j$ has a $p_i$ bit precision represented by $p_i$ bits.

According to an embodiment, the apparatus illustrated in FIG. 5 may further comprises an affinity unit 503 configured to generate an affinity model used to determine the linear embedding matrix A, wherein the affinity model comprises a first affinity parameter $d_{max}$, a second affinity parameter a, and an affinity matrix $W=(w_{j,k})$ of size n*n, n is a number of feature points in the first set of feature points, wherein a sparsity of the affinity matrix $W=(w_{j,k})$ is controlled by the first affinity parameter and the second affinity parameter. The first affinity parameter $d_{max}$ and the second affinity parameter a may be determined by experiments conducted on an image repository 501. The affinity matrix is determined by the first affinity parameter $d_{max}$ and the second affinity parameter a as $$w_{j,k} = \begin{cases} 0, & \text{if } \|F_j - F_k\| \geq d_{max} \\ e^{-a\|F_j - F_k\|}, & \text{else} \end{cases},$$

where $F_j$ and $F_k$ are feature points of the first set of feature points.

As an example embodiment, the apparatus illustrated in FIG. 5 may be located in a user equipment or in a base station. The apparatus in FIG. 5 generates compressed feature points which may be received by the server as illustrated in FIG. 1 unit 129.

The server unit 129 illustrated in FIG. 1 may comprise an image repository wherein an image in the image repository is represented by a set of feature points, a receiver configured to receive a set of compressed feature points of a first image, and a searching unit that matches the feature points of images stored in the repository to the set of received compressed feature points of the first image. The compressed feature points are generated by a linear embedding matrix determined by an affinity model comprising a first affinity parameter $d_{max}$, a second affinity parameter a, and an affinity matrix $W=(w_{j,k})$ of size n*n, wherein a sparsity of the affinity matrix $W=(w_{j,k})$ is controlled by the first affinity parameter and the second affinity parameter, and n is a number of feature points in the first set of feature points.

The search unit 119 performs search on the feature points. The feature points may be compressed. On the basis of the number of features they have in common with the query image, a short list of potentially similar images is selected from the database. To these images, further examination is applied, including a geometric verification step that looks for a coherent spatial pattern between features of the query image and the features of the candidate database image to ensure that the match is correct.

Figure 6:
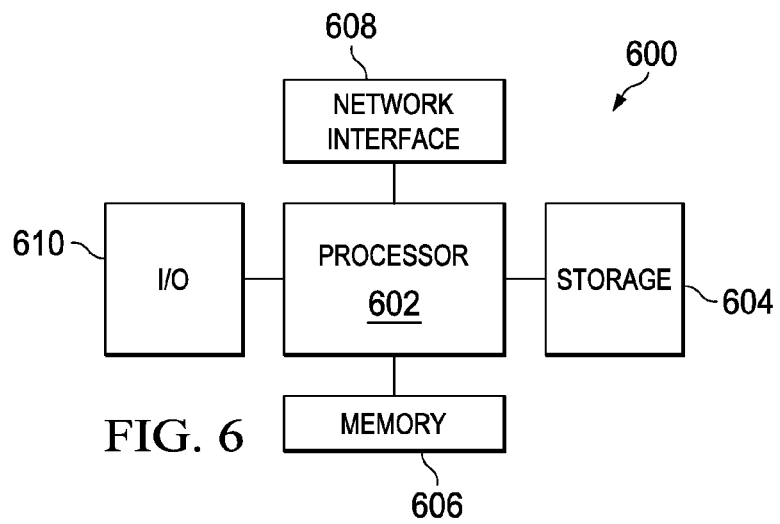
FIG. 6 illustrates an example implementation of the method.

Through the descriptions of the preceding embodiments, the present disclosure may be implemented by using hardware only or by using software and a necessary universal hardware platform. FIG. 6 illustrates one example of a unit or a controller 600 according to an embodiment of the invention. Unit 600 may be used in conjunction with and may perform the functions described in the disclosure. In the same or alternative embodiments, controller 600 may reside at, be component of, or may be used by one or more UEs, eNBs, and servers.

The unit 600 may contain a processor 602 that controls the overall operation of the controller 600 by executing computer program instructions which define such operation. Processor 602 may include one or more central processing units, read only memory (ROM) devices and/or random access memory (RAM) devices. The processor 602 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 604 (e.g., magnetic disk, database, etc.) and loaded into memory 606 when execution of the computer program instructions is desired. Thus, applications for performing the herein-described method steps, such as precoding, scheduling, transmitting and receiving data can be defined by the computer program instructions stored in the memory 606 or storage 604 and controlled by the processor 602 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 606 may store the software for the controller 600, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 600 may also include one or more network interfaces 608 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 600 could also include input/output devices 610 (e.g., display, keyboard, mouse, speakers, buttons, etc.) that enable user interaction with the controller 600. These user I/O devices are optional and not needed if the unit 600 is accessed by the network interfaces only.

An implementation of unit 600 could contain other components as well, and that the controller of FIG. 6 is a high level representation of some of the components of such a controller for illustrative purposes.

Embodiments of the present disclosure provide a number of new and advantageous features. For example, one embodiment provides a new visual feature description compression scheme that achieves very high accuracy at very low bit rate. Another embodiment provides a compression scheme that is scalable in bit rate and accuracy. Embodiments of the present invention can be used in a variety of products, processes and services. Some examples of these implementations include Cloud Based Media Processing, Next gen CDN product, CDN measure and operations. Embodiments are desirable because they can provides real-time, low computation/communication cost Quality of Experience (QoE) estimation at the client. For example, a robust QoE estimator with light weight video signature and minimum cost in computing and communication resources can be achieved. This would be useful in the CDN and wireless multi-media market.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing an image, the method comprising:
   determining, by a processor, a linear embedding operator by an affinity model comprising a first affinity parameter $d_{max}$, a second affinity parameter $\alpha$, and an affinity matrix $W=(w_{j,k})$ of size n*n, wherein a sparsity of the affinity matrix $W=(w_{j,k})$ is controlled by the first affinity parameter and the second affinity parameter, and n is a number of feature points in a first set of feature points; and
   generating, by the processor using the linear embedding operator, a second set of feature points from the first set of feature points of the image, wherein a pair-wise nearest neighbor (NN) topological relationship among the first set of feature points is preserved in the second set of feature points, and wherein a feature point is a point represented by a group of numbers.

2. The method of claim 1, wherein feature points in the first set of feature points are of a first dimension represented by a first quantity of numbers and feature points in the second set of feature points are of a second dimension smaller than the first dimension represented by a second quantity of numbers.

3. The method of claim 2, wherein a feature point in the second set of feature points has eight dimensions and a number in each dimension represented by six bits.

4. The method of claim 1, wherein the second set of feature points is used for visual search to identify the image from an image repository.

5. The method of claim 1, wherein the first set of feature points and the second set of feature points have a same number of feature points.

6. The method of claim 1, wherein the first set of feature points is a scale-invariant feature transform (SIFT) feature points of the image or a speeded up robust features (SURF) feature points of the image.

7. The method of claim 1, wherein the linear embedded operator is a solution A to an objective equation $$A^* = \arg\min_A \sum_{j,k} w_{j,k} \|AF_j - AF_k\|,$$

where $W=(w_{j,k})$ of size n*n is the affinity matrix, $F_j$ and $F_k$ are feature points of the first set of feature points.

8. The method of claim 1, wherein the linear embedding operator is a matrix A computed by A=eigenvalue(L), wherein the matrix L=S−W, S is a diagonal matrix with entry $$s_{k,k} = \sum_{j=1}^{n} w_{j,k},$$

and n is the number of feature points.

9. The method of claim 1, wherein the affinity matrix is determined by the first affinity parameter $d_{max}$ and the second affinity parameter a as $$w_{j,k} = \begin{cases} 0, & \text{if } \|F_j - F_k\| \geq d_{max} \\ e^{-a\|F_j - F_k\|}, & \text{else} \end{cases},$$

where $F_j$ and $F_k$ are feature points of the first set of feature points.

10. The method of claim 1, wherein the first affinity parameter $d_{max}$ is a first zero gradient of sorted pair-wise distance function for a sample feature point repository comprising a plurality of feature points.

11. The method of claim 1, wherein the second affinity parameter a is chosen so that the affinity matrix $W=(w_{j,k})$ is sparse.

12. The method of claim 11, wherein the second affinity parameter a value is obtained with equation $e^{-a*d_{max}^2}=0.25$.

13. The method of claim 1, wherein a feature point $F_j$ in $R^{n_j}$ of the second set of feature points has a first precision for a first dimension and a second precision for a second dimension.

14. The method of claim 13, wherein the first precision for the first dimension with a higher variance for the feature point $F_j$ is more than the second precision for the second dimension with a lower variance for the feature point $F_j$.

15. An apparatus for processing an image, the apparatus comprising:
   a receiver configured to receive a first set of feature points of the image;
   a processor comprising a linear embedding unit configured to generate, using a linear embedding operator, a second set of feature points from the first set of feature points, wherein a pair-wise nearest neighbor (NN) topological relationship among the first set of feature points is preserved in the second set of feature points, and wherein a feature point is a point represented by a group of numbers; and the processor comprising an affinity unit configured to generate an affinity model used to determine the linear embedding operator, wherein the affinity model comprises a first affinity parameter $d_{max}$, a second affinity parameter a, and an affinity matrix $W=(w_{j,k})$ of size n*n, n is a number of feature points in the first set of feature points, wherein a sparsity of the affinity matrix $W=(w_{j,k})$ is controlled by the first affinity parameter and the second affinity parameter.

16. The apparatus of claim 15, wherein the affinity matrix is determined by the first affinity parameter $d_{max}$ and the second affinity parameter a as $$w_{j,k} = \begin{cases} 0, & \text{if } \|F_j - F_k\| \geq d_{max} \\ e^{-a\|F_j - F_k\|}, & \text{else} \end{cases},$$

where $F_j$ and $F_k$ are feature points of the first set of feature points.

17. The apparatus of claim 15, wherein the apparatus is located in a user equipment or in a base station.

18. An apparatus for processing an image, the apparatus comprising:
a non-transitory storage memory having an image repository wherein an image in the image repository is represented by a set of feature points;
a receiver configured to receive a set of compressed feature points of a first image; and
a processor comprising:
a searching unit configured to match the feature points of images stored in the repository to the received set of compressed feature points of the first image;
an affinity unit configured to determine a linear embedding operator by an affinity model comprising a first affinity parameter $d_{max}$, a second affinity parameter a, and an affinity matrix $W=(w_{j,k})$ of size n*n, wherein n is a number of feature points in the set of feature points; and
a linear embedding unit configured to generate the compressed feature points using the linear embedding operator, wherein a sparsity of the affinity matrix $W=(w_{j,k})$ is controlled by the first affinity parameter and the second affinity parameter.

19. The apparatus of claim 18, wherein the affinity matrix is determined by the first affinity parameter $d_{max}$ and the second affinity parameter a as $$w_{j,k} = \begin{cases} 0, & \text{if } \|F_j - F_k\| \geq d_{max} \\ e^{-a\|F_j - F_k\|}, & \text{else} \end{cases},$$

where $F_j$ and $F_k$ are feature points of the set of feature points.

20. A method for processing an image, the method comprising:
generating, by a processor using a linear embedding operator, a second set of feature points from a first set of feature points of the image, wherein a pair-wise nearest neighbor (NN) topological relationship among the first set of feature points is preserved in the second set of feature points, and wherein a feature point is a point represented by a group of numbers,
wherein feature points in the first set of feature points are of a first dimension represented by a first quantity of numbers and feature points in the second set of feature points are of a second dimension, smaller than the first dimension, represented by a second quantity of numbers, and
wherein a feature point in the second set of feature points has eight dimensions and a number in each dimension represented by six bits.

* * * * *

UNITED STATES PATENT AND TRADEMARK OFFICE
CERTIFICATE OF CORRECTION

PATENT NO. : 8,755,605 B2  
APPLICATION NO. : 13/340327  
DATED : June 17, 2014  
INVENTOR(S) : Xin Xin It is certified that error appears in the above-identified patent and that said Letters Patent is hereby corrected as shown below:

In the Specification:

In Col. 6, line 1, Detailed Description Of Illustrative Embodiments, delete "parameter a" and insert -- parameter $\alpha$ --.
In Col. 6, line 43, Detailed Description Of Illustrative Embodiments, delete "parameter a" and insert -- parameter $\alpha$ --.
In Col. 6, line 51, Detailed Description Of Illustrative Embodiments, delete "parameter a" and insert -- parameter $\alpha$ --.
In Col. 7, line 27, Detailed Description Of Illustrative Embodiments, delete "parameter a" and insert -- parameter $\alpha$ --.
In Col. 7, lines 33-34, Detailed Description Of Illustrative Embodiments, delete "parameter a" and insert -- parameter $\alpha$ --.
In Col. 7, line 35, Detailed Description Of Illustrative Embodiments, delete "parameter a" and insert -- parameter $\alpha$ --.
In Col. 7, line 58, Detailed Description Of Illustrative Embodiments, delete "parameter a" and insert -- parameter $\alpha$ --.

In the Claims:

In Col. 10, line 30, claim 9, delete "parameter a" and insert -- parameter $\alpha$ --.
In Col. 10, line 44, claim 11, delete "parameter a" and insert -- parameter $\alpha$ --.
In Col. 10, line 47, claim 12, delete "parameter a" and insert -- parameter $\alpha$ --.
In Col. 11, line 5, claim 15, delete "parameter a" and insert -- parameter $\alpha$ --.
In Col. 11, line 12, claim 16, delete "parameter a" and insert -- parameter $\alpha$ --.
In Col. 11, line 36, claim 18, delete "parameter a" and insert -- parameter $\alpha$ --.
In Col. 12, line 11, claim 19, delete "parameter a" and insert -- parameter $\alpha$ --.

Signed and Sealed this  
Twenty-third Day of September, 2014

Michelle K. Lee  
*Deputy Director of the United States Patent and Trademark Office*